June 8, 1926.

G. R. CUNNINGTON 1,587,762

SHIELD FOR AUTO WHEELS

Filed May 9, 1924

G.R.Cunnington
INVENTOR

BY Victor J. Evans
ATTORNEY

WITNESS:

June 8, 1926.
G. R. CUNNINGTON
SHIELD FOR AUTO WHEELS
Filed May 9, 1924
1,587,762
2 Sheets-Sheet 2
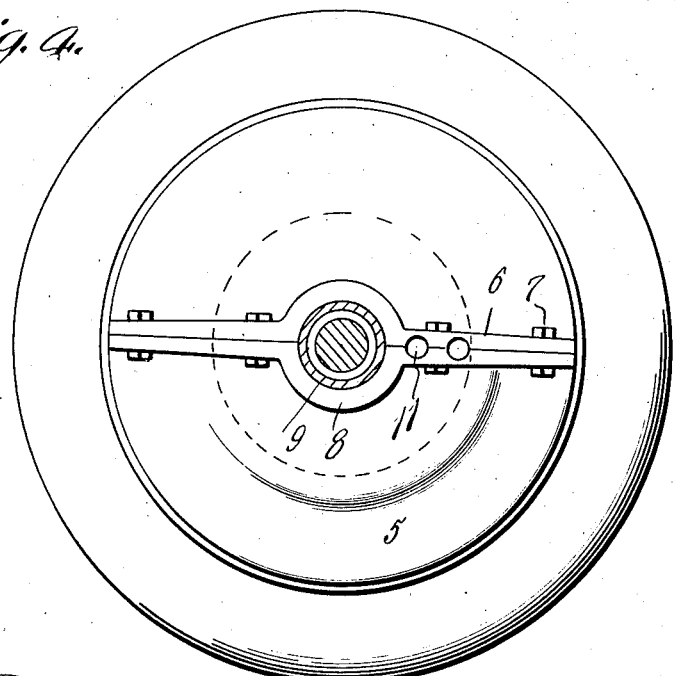
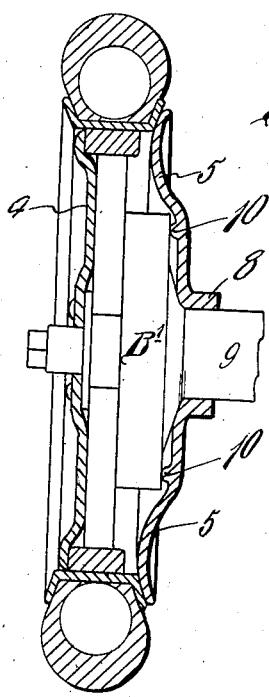
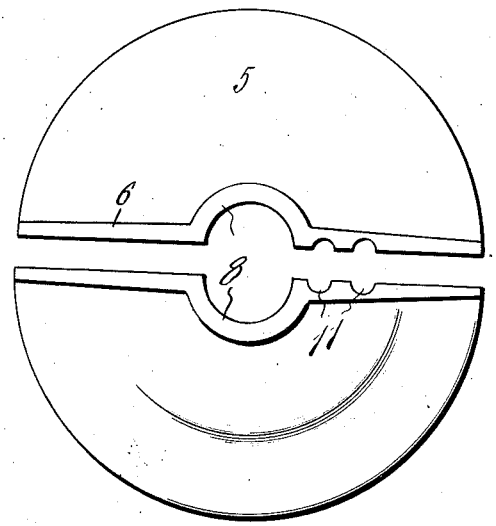
G. R. Cunnington
INVENTOR
BY Victor J. Evans
ATTORNEY
WITNESS:

Patented June 8, 1926.

1,587,762

UNITED STATES PATENT OFFICE.

GEORGE R. CUNNINGTON, OF AKRON, OHIO, ASSIGNOR TO THE PAINE-CUNNINGTON COMPANY, OF CLEVELAND, OHIO, A CORPORATION OF OHIO.

SHIELD FOR AUTO WHEELS.

Application filed May 9, 1924. Serial No. 712,096.

This invention relates to means for protecting the braking means on the wheels of motor vehicles and the like from mud, water and the like, the general object of the invention being to provide a shield with means for fastening it in a position where it will cover the braking elements and thus protect them from dirt, snow, water and the like.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 4 is a view similar to Figure 1 showing a modification.

Figure 5 is a longitudinal sectional view through Figure 4.

Figure 6 is a view of the form of shield shown in Figures 4 and 5.

Figure 1:
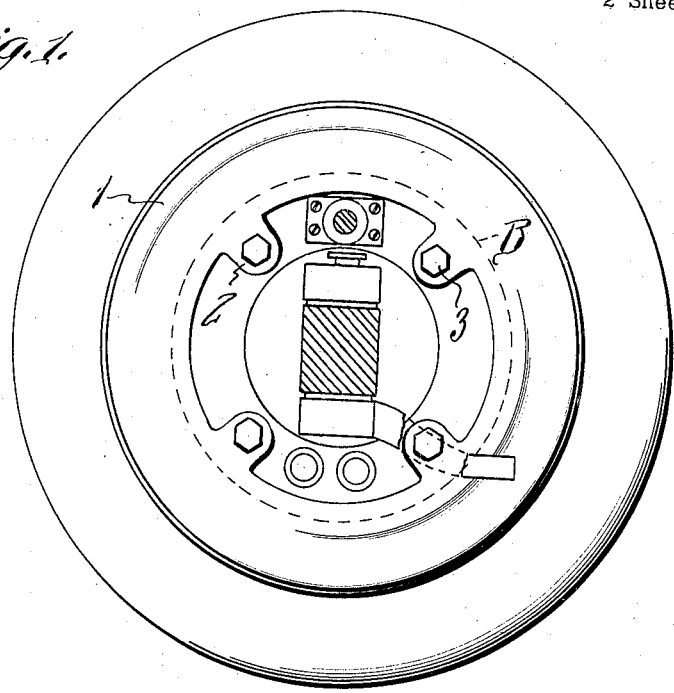
Figure 1 is an inner face view of a wheel showing my invention in use.
Figure 2:
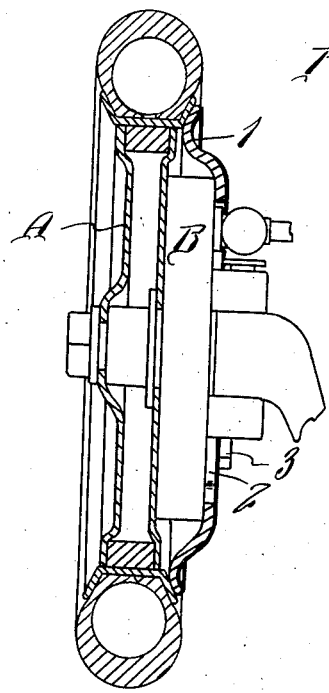
Figure 2 is a sectional view through Figure 1.
Figure 3:
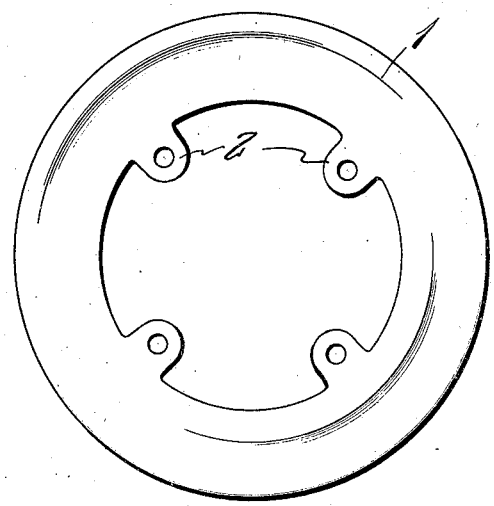
Figure 3 is a view of the shield itself.

Figures 1, 2 and 3 show a shield 1 for use on the disc type of wheel, such as shown at A, in Figures 1 and 2. This shield is of ring shape and is of curved construction in cross section shown in Figure 2. It is provided with the inwardly extending ears 2 for receiving the bolts 3 which enter the adjacent lateral wall of the braking means B and thus hold the shield in position with its inner edge in permanent close fitting contact with such wall and with its outer edge abutting tightly the rim of the wheel but not attached thereto so that the latter is free to revolve. As a result the braking means are thoroughly covered and are thus protected from dirt, water and other foreign matter, inasmuch as the shield being of ring-shape, surrounds the hub of the wheel and completely closes the brake actuating means as clearly shown in Figures 1 and 2.

In the spoke type of wheel shown in Figures 4 and 5 I provide an outer shield 4 which has its outer edge slightly offset to engage the wheel felly and its center is provided with an opening to receive the hub cap. The inner brake-shield proper, as before consists of an annular plate 5, which is however, shown as made out of two sections, the abutting edges of which are provided with flanges 6 which are adapted to be connected together by the bolts 7 and the central parts of these flanges form a boss 8 fashioned to engage the axle housing 9 to which the shield is thus fixedly clamped. The inner face of the shield 5 is provided with an annular rib 10 which bears against the brake drum B' and the outer edge of the shield as before presses firmly against but has movable contact with the tire rim as shown in Figure 5. Thus the braking means of a wooden or spoke wheel is thoroughly covered by these two shields. The shield 5 is provided with openings 11 through which the brake operating rods pass. In the form shown in Figures 1, 2 and 3 the wheel must be removed to place the shield in position but in the form shown in Figures 4, 5 and 6 the wheel need not be removed.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. The combination with the wheel of a motor vehicle having braking means associated therewith; of a shield for said braking means in the form of an annular plate non-rotatably secured at its center and adapted movably to contact at its periphery with the rim of said wheel.

2. The combination with the wheel of a motor vehicle having braking means associated therewith; of a shield for said braking means in the form of an annular plate non-rotatably secured at its center to the adjacent lateral wall of said braking means and adapted movably to contact at its periphery with the rim of said wheel.

3. The combination with the wheel of a motor vehicle having braking means associated therewith; of a shield for said braking means in the form of an annular plate non-rotatably secured at its center and having its peripheral portion formed and disposed to have close-fitting but movable contact with the rim of said wheel.

4. The combination with the wheel of a motor vehicle having braking means associated therewith; of a shield for said braking means in the form of an annular plate non-rotatably secured at its center and having its peripheral portion slightly curved over about said braking means and thence extending toward the rim of the wheel.

In testimony whereof I affix my signature.

GEORGE R. CUNNINGTON.